(12) United States Patent
Reed, Jr.

(10) Patent No.: US 6,435,888 B1
(45) Date of Patent: Aug. 20, 2002

(54) CAPTIVE SPLICE ASSEMBLY FOR ELECTRICAL BUS AND METHOD FOR USING SAME

(75) Inventor: Thomas W Reed, Jr., Westminster, SC (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/861,470

(22) Filed: May 18, 2001

(51) Int. Cl.[7] .................................................. H01R 4/60
(52) U.S. Cl. ...................................... 439/213; 174/88 B
(58) Field of Search ............................... 439/213, 359, 439/210; 174/88 B, 68.2

(56) References Cited

U.S. PATENT DOCUMENTS

| | | | |
|---|---|---|---|
| 3,187,086 A | * 6/1965 | Modie et al. .............. 174/68.2 |
| 4,008,365 A | * 2/1977 | Carlson ..................... 174/68.2 |
| 4,174,143 A | 11/1979 | Hicks et al. ................ 439/213 |
| 4,740,864 A | 4/1988 | Stanfield et al. ........... 361/611 |
| 4,979,906 A | * 12/1990 | Shrout et al. .............. 439/213 |
| 5,261,830 A | * 11/1993 | Jego et al. .................. 439/210 |
| 5,401,906 A | * 3/1995 | Bryant ..................... 174/88 B |
| 5,760,339 A | * 6/1998 | Faulkner et al. .......... 174/88 B |
| 5,785,542 A | * 7/1998 | Johnson ..................... 439/213 |
| 5,821,464 A | * 10/1998 | Graham et al. ........... 174/88 B |

* cited by examiner

Primary Examiner—Tulsidas Patel
(74) Attorney, Agent, or Firm—David R. Stacey; Larry T. Shrout; Larry I. Golden

(57) ABSTRACT

A method and captive splice assembly for electrically and structurally connecting a pair of bus sections. The assembly includes a housing, which holds captive a set of splice bars. The housing has a set of captive nuts, which are engaged by a set of bolts which pass through the splice bars. During installation, the captive splice bars are held fixed in the housing by way of notches in the splice bars and protruding tangs in the housing. After installation, the splice bars are interleaved with the bars of a pair of bus sections, and the bolts compress the splice bars and sections of bus, forming an electrical and structural connection between the pair of bus sections. The housing is fabricated of either a non-magnetic metal or plastic material.

18 Claims, 5 Drawing Sheets

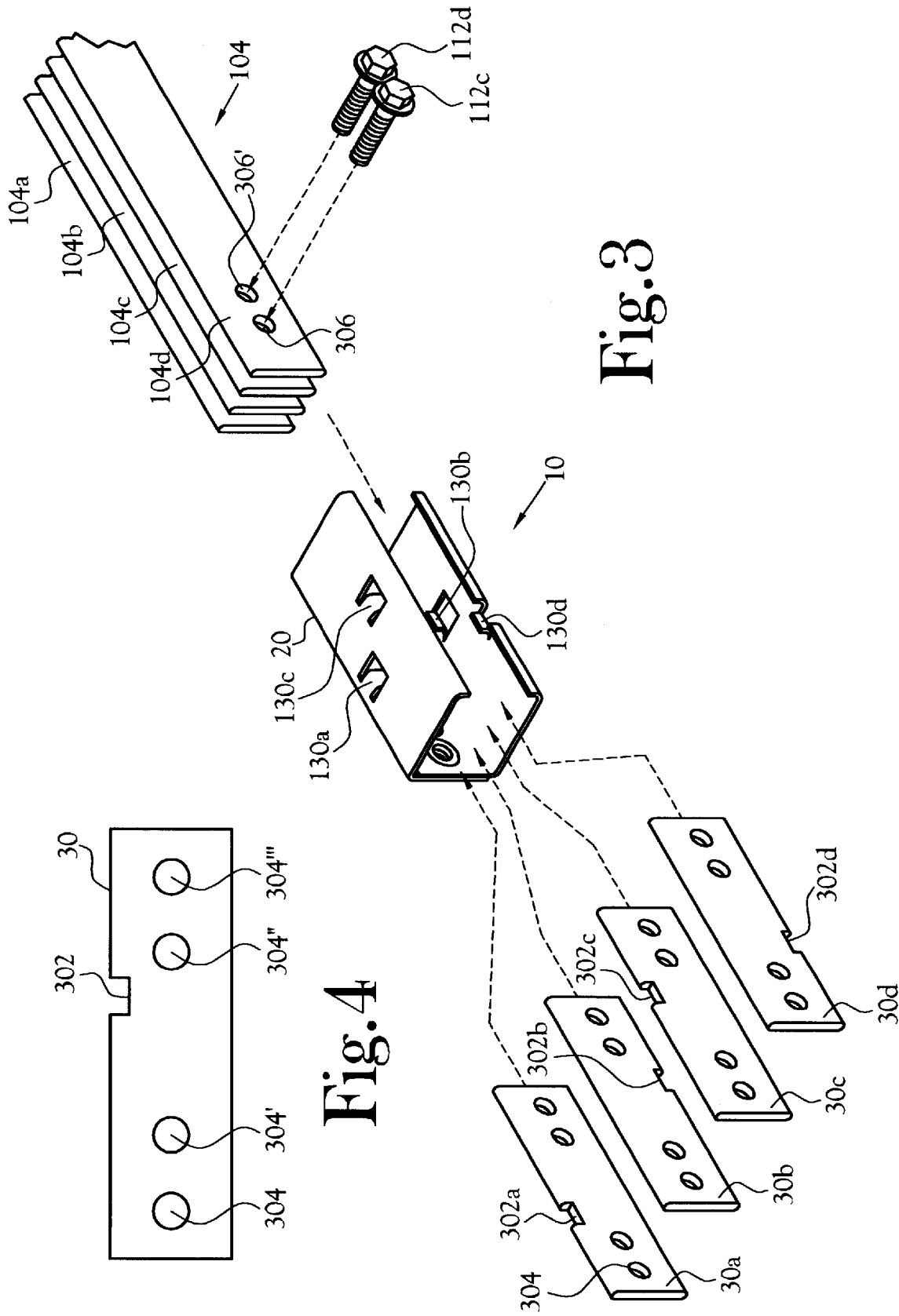

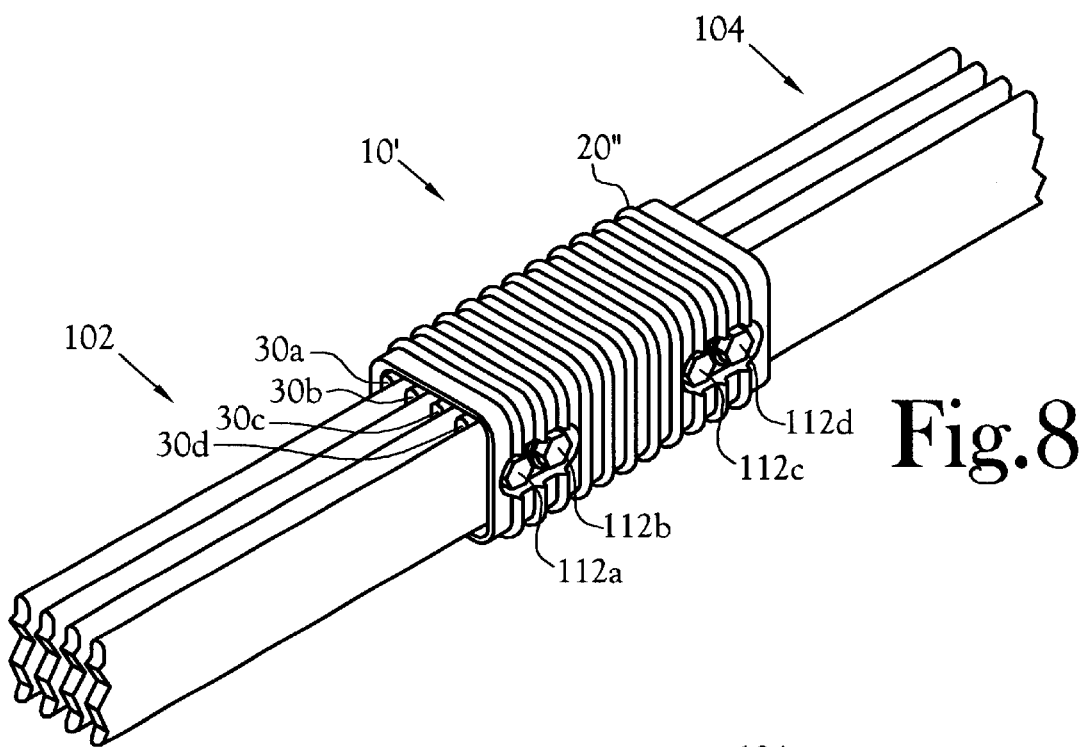
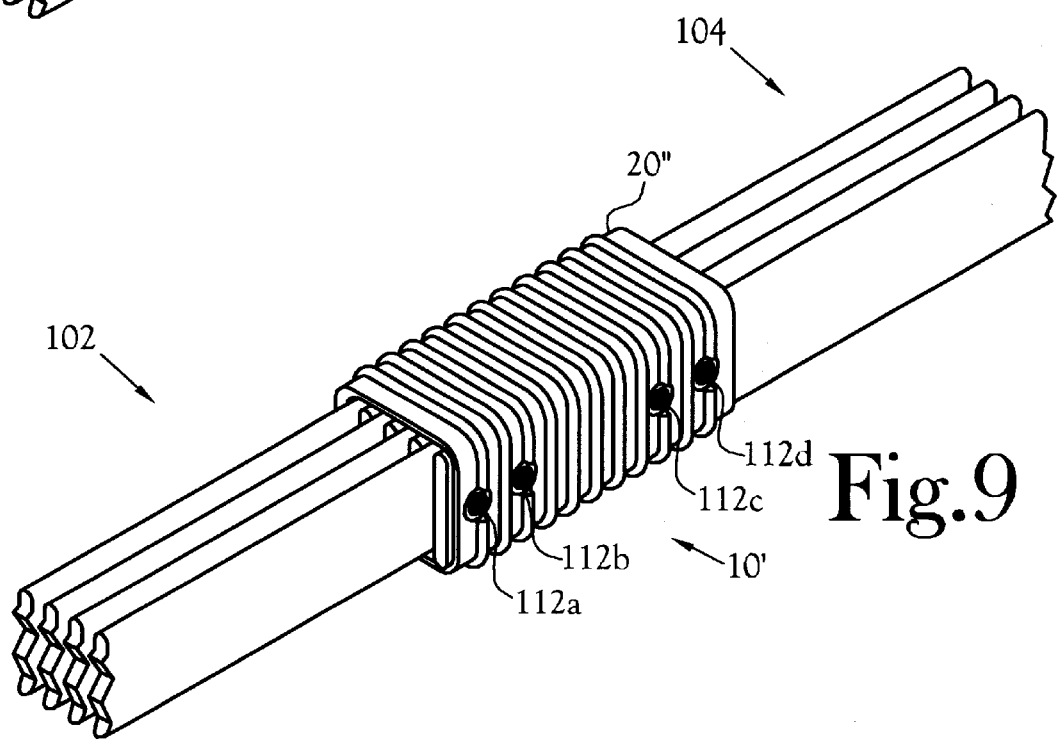

CAPTIVE SPLICE ASSEMBLY FOR ELECTRICAL BUS AND METHOD FOR USING SAME

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to electrical bus. More particularly, this invention pertains to a captive splice system for connecting sections of electrical bus.

2. Description of the Related Art

Electrical buses are commonly used to connect various pieces of electrical equipment, including control centers, load centers, and switchgear. Buses typically include conductors for each phase and may include neutral and ground conductors. It is common for bus conductors to be made of a plurality of conducting bars. That is, each phase, neutral, or ground conductor has one or more conducting bars mounted parallel to each other.

Electrical bus is manufactured in sections, which have a specified length. During assembly, the various sections of electrical bus need to be connected, or spliced, to form an electrical circuit. It is well known in the art to splice bus bars by clamping splice plates or splice bars on either side of the bus bars. For bus sections with multiple bars, at the end where the splice is to be made, the bars have an air gap separating them that is equal to the thickness of the splice bars. Representative of improvements on the basic splice are the following patents: U.S. Pat. No. 4,174,143, issued to Hicks, et al., on Nov. 13, 1979, titled "Bus Duct Joint Employing Lightly-Loaded Multiple-Point Electrical Connector," discloses a single-bolt joint that is securely fastened to the end of one bus section and slidably engages the end of a second bus section with no further tightening of the single fastener. The Hicks patent discloses a bus joint that connects multiple phases and permits thermal expansion of the bus members.

U.S. Pat. No. 4,740,864, issued to Stanfield, et al., on Apr. 26, 1988, titled "Horizontal Bus Bar Splice for Control Center," discloses a slidable splice plate assembly that sandwiches splice bars between the bus bars and has through-bolts to clamp the bars. The Stanfield patent discloses a splice plate assembly that includes an insulated slide plate with protruding tabs and nubs that serve to maintain the position of the splice bar. The sidable splice plate assembly connects bus bars of adjacent control center sections. When each section is shipped, the slidable splice plate assembly is fastened to the bus bars such that the edge of the assembly is flush with the end of the bus bars. After the sections are butted together, the assembly is slid along the bus bars until the joint between the bus bars of the adjacent sections is centered in the assembly, which is then bolted to the bus bars, forming an electrical splice.

BRIEF SUMMARY OF THE INVENTION

According to one embodiment of the present invention, a captive bus bar splice assembly and a method for using same are provided. The captive splice assembly electrically and structurally links sections of electrical bus. The captive splice assembly is a self-contained splice assembly that minimizes the installation steps by having all the necessary components in a single assembly and holding captive the splice plates while positioning the assembly on the bus sections to be spliced.

The captive splice assembly includes a housing, which holds captive a set of splice bars. The housing has a set of captive nuts, which are engaged by a set of bolts which pass through the splice bars. After installation, the splice bars are interleaved with the bars of a pair of bus sections, and the bolts compress the splice bars and sections of bus, forming an electrical and structural connection between the pair of bus sections.

In one embodiment, the housing is fabricated of a non-magnetic metal. The housing has tangs or protrusions that engage slots in the splice bars and serve to prevent the splice bars from being ejected from the housing as the bus section is inserted into the captive splice assembly. The captive nuts are fixed to the back side of the housing. Another embodiment provides a housing fabricated of plastic material with the nuts held captive in either the plastic housing or by a splice bar which is adjacent to the back side of the housing.

One method of using the captive splice assembly is to assemble the splice assembly, slide the assembly fully onto a first bus section, butt a second bus section to the first, slide the assembly from the first bus section to the second such that the joint formed between the bus sections is substantially at the midpoint of the splice assembly, aligning the bolt holes in the bus sections and the splice assembly, and fastening the splice assembly to the bus sections by inserting and tightening bolts in the bolt holes.

Another method is to assemble the splice assembly, slide the assembly on a first bus section, align the assembly bolt holes with the bus section bolt holes, insert and tighten bolts in the bolt holes for the first bus section, and then insert a second bus section into the assembly, align the assembly bolt holes with the bus section bolt holes, insert and tighten bolts in the bolt holes for the second bus section.

BRIEF DESCRIPTION OF THE SEVERAL VIEWS OF THE DRAWINGS

The above-mentioned features of the invention will become more clearly understood from the following detailed description of the invention read together with the drawings in which:

FIG. 3 is an exploded diagram showing the housing, the captive splice bars, and a section of bus;

FIG. 4 is a front view of a captive splice bar;

FIG. 8 is a perspective view of a captive bus splice assembly fabricated with a plastic housing; and FIG. 9 is a perspective view of the back side of a captive bus splice assembly fabricated with a plastic housing.

DETAILED DESCRIPTION OF THE INVENTION

An apparatus for splicing electrical bus bars is disclosed. A captive splice assembly 10 includes a housing 20 and a set of electrically conductive splice bars 30 held captive by the housing.

Figure 1:
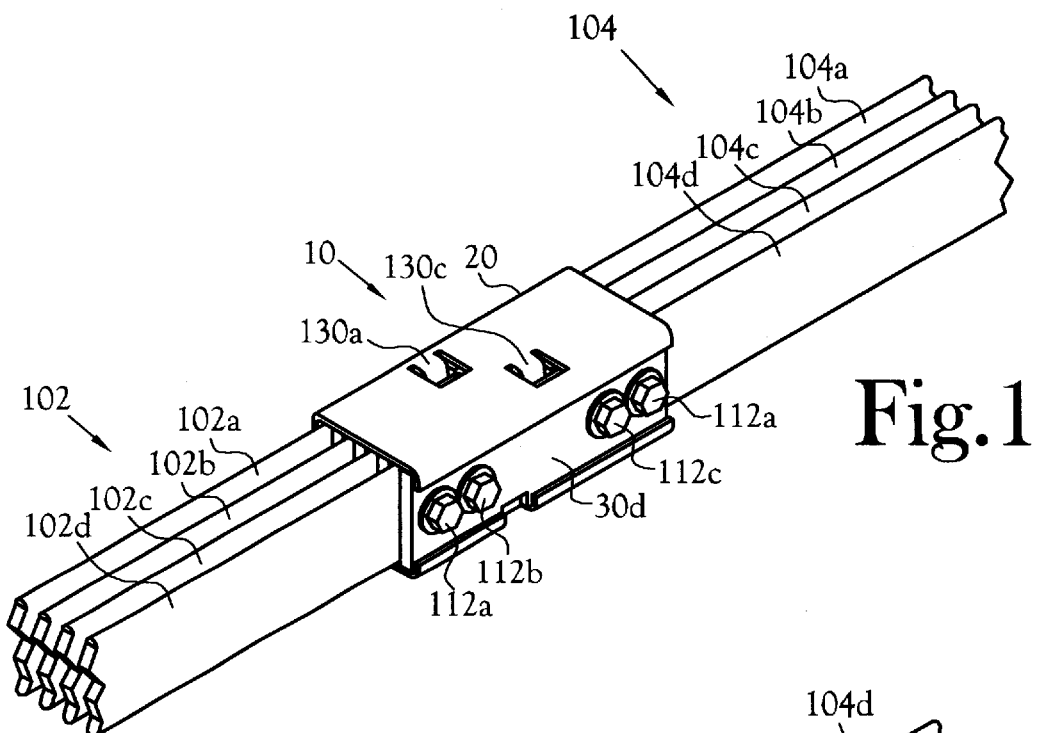
FIG. 1 is a perspective view of a captive bus splice assembly with two sections of bus.

FIG. 1 illustrates an embodiment of the invention, which is shown connecting two sections of bus 102, 104. The splice bars 30 are interleaved between the individual bars 102a, 102b, 102c, 102d, 104a, 104b, 104c, 104d of sections of electrical bus 102, 104, and a set of bolts 112 is used to join the splice bars 30 to the housing 20 and the sections of bus 102, 104.

The housing 20 is made of stainless steel, copper, aluminum, or some other non-magnetic metal to minimize eddy-current heating effects. Another embodiment, illustrated in FIGS. 8 and 9, uses plastic for the housing material. The housing 20 forms a 'C' shape, which conforms to three sides of the group of bus bars 30, 102, 104. The C shape also minimizes the effects of eddy-current and permits the passage of the clamping bolts 112. The housing 20 has tangs 130a, 130b, 130c, 130d punched through the top and bottom surfaces of the housing 20. The tangs 130 protrude into the housing 20 and engage slots, or notches, 302 in the splice bars 30a, 30b, 30c, 30d. The tangs 130 prevent the splice bars 30 from being laterally displaced in the housing 20 when the housing 20 is positioned on the section of bus 102, 104. Those skilled in the art will recognize that other means for laterally locking the splice bars 30 in position can be used without departing from the spirit and scope of the present invention. For example, formed flanges can be used to engage slots in the splice bars 30. Also, those skilled in the art will recognize that the placement of the tangs 130a, 130b, 130c, 130d can be varied without departing from the spirit and scope of the present invention. For example, if space permits, all the tangs 130a, 130b, 130c, 130d can be located on the top side of the housing 20. Another example has the tangs 130 in pairs at opposite ends of the housing 20, and each pair of tangs 130 would engage the opposite sides of the splice bars 30, preventing the lateral, or longitudinal, movement of the splice bars 30 in either direction. A still another example has the tangs 130 formed on the splice bars 30 and the notches 302 as openings in the housing 20. The illustrated embodiment shows the housing 20 to be fabricated of two metal pieces; however, those skilled in the art will recognize that the housing 20 can be fabricated from a single formed piece of metal without departing from the spirit and scope of the present invention.

Figure 2:
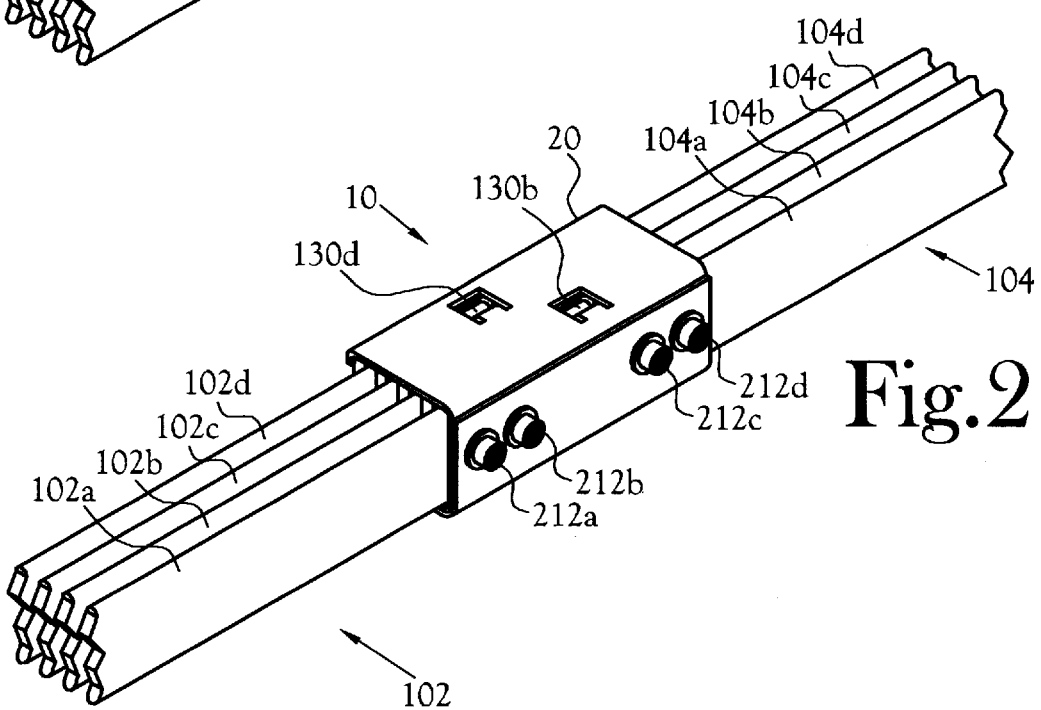
FIG. 2 is a perspective view of the back side of a captive bus splice assembly with two sections of bus.

FIG. 2 illustrates the back and bottom sides of the housing 20. Captive nuts 212a, 212b, 212c, 212d are fixed to the back side of the housing 20 and engage the corresponding bolts 112 inserted from the front side of the captive splice assembly 10. Those skilled in the art will recognize that the nuts can be of the welded type, compression type, press-in type, or any other captive type without departing from the spirit and scope of the present invention. Another embodiment has the function of the nuts met by increasing the thickness of the back side of the housing 30 and threading the openings.

FIG. 3 illustrates an exploded view of the captive splice assembly 10, showing the splice bars 30, the housing 20, and a section of bus 104. In the illustrated embodiment, the bus section comprises four bus bars 104a, 104b, 104c, 104d and the housing 20 is configured to contain four splice bars 30a, 30b, 30c, 30d. The splice bars 30 are positioned in the housing 20 such that the splice bar notches 302a, 302b, 302c, 302d engage the corresponding tangs 130a, 130b, 130c, 130d. When positioned in the housing 20, the splice bars 30 are held captive when the clamping bolts 112 are inserted in the bolt holes 304 in the splice bars 30 and the clamping bolts 112 engage the nuts 212. The splice bars 30 are illustrated with the notches 302 positioned such that each notch 302 will engage the appropriate tang 130 in the housing 20.

To fasten the captive splice assembly 10 to a section of bus 104, the individual bus bars 104a, 104b, 104c, 104d are positioned between the inside back surface of the housing 20 and the splice bars 30a, 30b, 30c, 30d, and the clamping bolts 112c, 112d are inserted through the aligned bolt holes 304″, 304‴, 306, 306'. The clamping bolts 112c, 112d engage the nuts 212c, 212d and when tightened, clamp the captive splice assembly 10 to the bus section 104.

FIG. 4 illustrates a front view of a splice bar 30, showing the notch 302 and the bolt holes 304. The notch 302 is offset from the center of the splice bar 30. The bolt holes 304 are symmetrically located about the center of the splice bar 30. The arrangement of the notch 302 and the bolt holes 304 are such that the splice bar 30 can be rotated and/or flipped to align the notch 302 with the corresponding tang 130 and the bolt holes 304 will be aligned with the bolt holes 304 of the other splice bars 30 and the nuts 212.

Figure 5A:
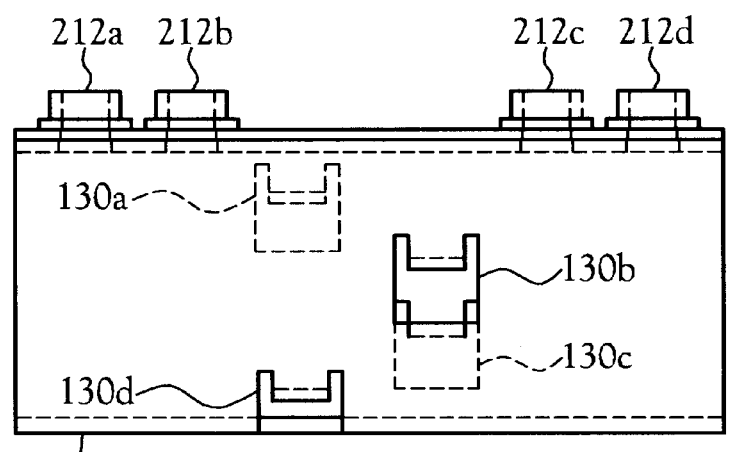
FIG. 5a is a top view of a housing for four captive splice bars.
Figure 5B:
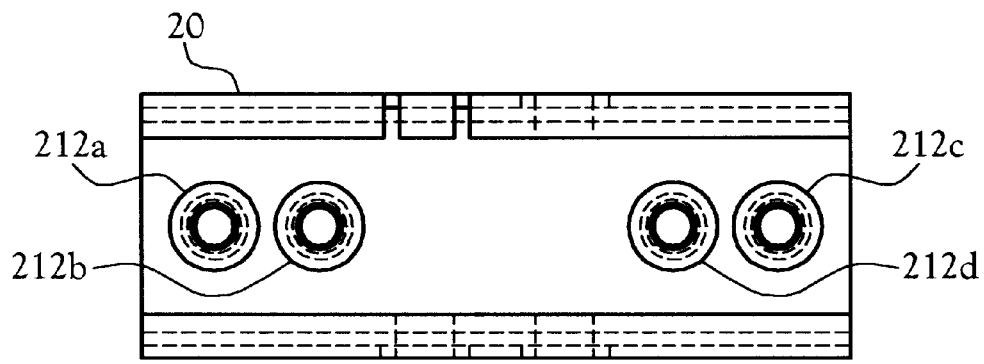
FIG. 5b is a front view of the housing.
Figure 5C:
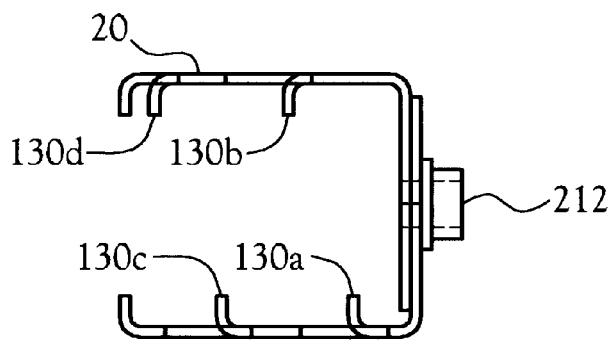
FIG. 5c is a side view of the housing.

FIGS. 5a, 5b, and 5c show, respectively, the top, front, and side view of an embodiment of the housing 20 sized to hold captive four splice bars 30. These figures illustrate the relative position of the tangs 130a, 130c punched through the top surface of the housing 20 and tangs 130b, 130d punched through the bottom surface of the housing 20. The tangs 130 are symmetrically located about the longitudinal center of the housing 20. This symmetry allows a single splice bar 30 to be used in any of the four splice bar locations in the housing 20 by simply flipping or rotating the splice bar 30 such that the notch 302 of the splice bar 30 is aligned with the appropriate tang 130. Further, the tangs 130 are positioned such that when the tangs 130 engage the splice bar 30 notches 302, the splice bars 30 have sufficient space between them to allow each bus bar 102, 104 to be inserted between them. When the clamping bolts 112 engage the nuts 212 and clamp the splice bars 30 and the bus bars 102, 104, the notches 302 have such a shape and clearance as not to be restricted by the tangs 130, and the splice bars 30 can move laterally towards the back side of the housing 20.

Figure 7A:
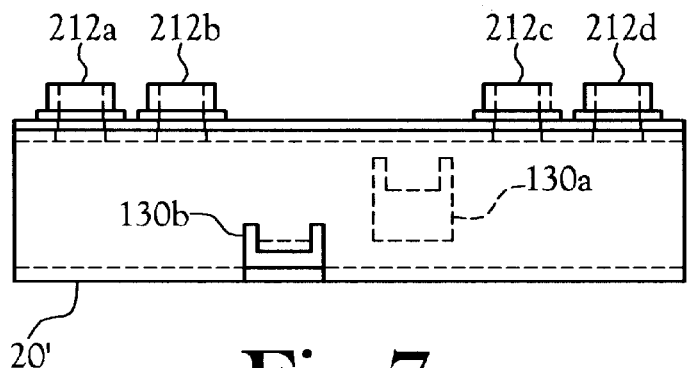
FIG. 7a is a top view of the housing.
Figure 7B:
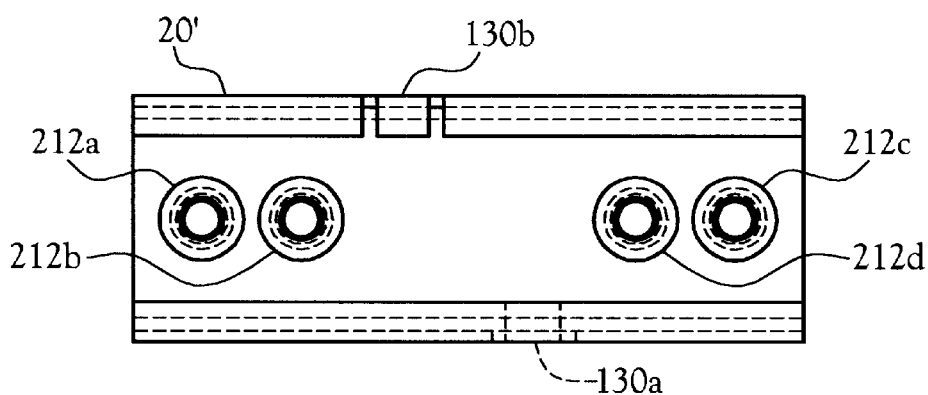
FIG. 7b is a front view of the housing.
Figures 6, 7C:
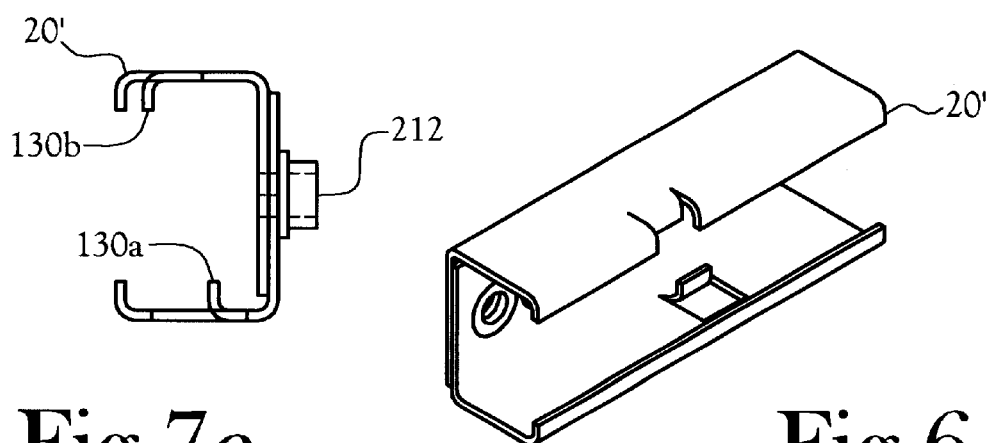
FIG. 6 is a perspective view of a housing for two captive splice bars.
FIG. 7c is a side view of the housing.

FIG. 6 illustrates a perspective view of an embodiment of a housing 20' sized to hold captive two splice bars 30. FIGS. 7a, 7b, and 7c show, respectively, the top, front, and side view of an embodiment of the housing 20' sized to hold captive two splice bars 30a, 30b. Two tangs 130a, 130b are positioned in the housing 20' to accommodate the two captive splice bars 30. Captive nuts 212a, 212b, 212c, 212d are attached to the outside back of the housing 20', similar to that illustrated in FIGS. 5a, 5b, and 5c. Those skilled in the art will recognize that the housing 20 can be sized to accommodate any number of splice bars 30 by changing the depth of the housing 20 and the number of tangs 130 without departing from the spirit and scope of the present invention.

FIGS. 8 and 9 show a perspective view of a captive splice assembly 10 with a housing 20″ fabricated out of a plastic material. Those skilled in the art will recognize that various means for providing the functionality of the tangs 130 used in the metal fabricated housing 20 can be employed without departing from the spirit and scope of the present invention. For example, the housing 20" can have molded protrusions that engage the notches 302 in the splice bars 30. Also, the nuts 212 for the plastic housing 20" can be the press-in type and attached to the rear outer-most splice bar 30 or be placed in recesses formed in the rear of the housing 20". The plastic housing 20" can be formed with ridges for easy hand gripping (as illustrated) or with other known features for ease of handling.

The captive splice assembly 10 is a self-contained assembly that can be installed as an assembly with minimal installation steps. Before splicing bus sections 102, 104, the splice bars 30 are inserted in the housing 20 such that each splice bar notch 302 engages a tang 130. Those skilled in the art will recognize that a spacing jig, or shipping spacer, (not illustrated) can be used to maintain the spacing of the splice bars 30 before inserting the bus section 102, 104 into the splice assembly 10. After the splice bars 30 are inserted in the housing 20, the bolts 112 can be inserted through the splice bar bolt holes or apertures and into the captive nuts 212, thereby holding captive all the components of the captive splice assembly 10.

During installation of the captive splice assembly 10, the captive splice assembly 10 is first placed against the end of the bus section 102, 104 and then the captive splice assembly 10 is slid onto the bus section 102 with the bus section bars 102a, 102b, 102c, 102d being interleaved between the splice bars 30. The tangs 130, by engaging the notches 302, prevent the splice bars 30 from being pushed out of the captive splice assembly 10. If a spacing jig is used, it can be removed after the bus bars 102 are inserted in the captive splice assembly 10 because the bus bars 102 will maintain the splice bar 30 spacing. After the first bus section 102 is inserted into the captive splice assembly 10, the second bus section 104 is inserted into the captive splice assembly 10, either by, first, sliding the captive splice assembly 10 fully onto the first bus section 102, butting the second bus section 104 against the first, and then sliding the captive splice assembly 10 onto the second bus section 104 until the captive splice assembly 10 bolt holes are aligned with the bus section 102, 104 bolt holes, and then inserting and tightening the bolts 112 for the bus sections 102, 104, or by, second, aligning the captive splice assembly 10 bolt holes with the first bus section 102 bolt holes and inserting and tightening the bolts 112 for the first bus section 102 and then inserting the second bus section 104 until the captive splice assembly 10 bolt holes are aligned with the second bus section 104 bolt holes and inserting and tightening the bolts 112 for the second bus section 104.

Those skilled in the art will recognize that the relationship of the bus bars 102, 104 to the housing 20 and the splice bars 30 can vary without departing from the spirit and scope of the present invention. For example, the embodiment illustrated in FIGS. 1 and 2 show the bus bars 102a, 104a between the back side of the housing 20 and splice bar 30a. Alternatively, the splice bar 30a can be located adjacent to the back side of the housing 20. With respect to the plastic housing 20", FIGS. 8 and 9 illustrate an embodiment with the splice bar 30a located adjacent the back of the housing 20". One embodiment of the captive splice assembly 10' with a plastic housing 20" uses nuts 212 held captive by the splice bar 30a, either by the nuts 212 being of the press-in type or another captive type fixed to the splice bar 30a. Another embodiment can use nuts 212 inserted in pockets or recesses in the plastic housing 20", in which case the. splice bar 30a is not required to be adjacent to the back side of the housing 20".

From the forgoing description, it will be recognized by those skilled in the art that a captive splice assembly has been provided. The captive splice assembly includes a housing, a set of captive splice bars, and mating bolts and nuts for clamping the splice bars to a section of bus. The housing holds captive the set of splice bars, which are interleaved with the bars of the sections of bus to be electrically and structurally connected. The captive splice assembly is a self-contained splice assembly that minimizes the installation steps by having all the necessary components in a single assembly and holding captive the splice bars while positioning the assembly on the bus sections to be spliced. The captive splice assembly disclosed is capable of passing the International Electrotechnical Commission (IEC) standard for a one-second short-circuit bus withstand test.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. A captive splice assembly for electrically and structurally connecting a first bus bar to a second bus bar, said assembly comprising:
   a first wall;
   a second wall secured to said first wall along a common first edge, said second wall being oriented generally perpendicular to said first wall and including a threaded aperture;
   a third wall secured to said second wall along a common second edge, said third wall being oriented generally parallel to, and in opposition to, said first wall,
   a splice bar located between said first wall and said third wall, said splice bar being oriented generally parallel to said second wall and defining an aperture, said splice bar aperture being aligned with said threaded aperture included in said second wall;
   a connector joining said splice bar to one of said first wall and said third wall; and
   an elongated threaded connector adapted to extend through said aperture in said splice bar and threadably engage said threaded aperture to secure said first bus bar and said second bus bar between said splice bar and said second wall.

2. The assembly of claim 1 further comprising a second elongated threaded connector adapted to extend through a second aperture in said splice bar and threadably engage a second threaded aperture included in said second wall to secure said first bus bar and said second bus bar between said splice bar and said second wall.

3. The assembly of claim 1 wherein said connector includes a notch in said splice bar and a protrusion extending into a space between said first wall and said third wall.

4. The assembly of claim 1 wherein said threaded aperture is a nut attached to said second wall.

5. The assembly of claim 1 further comprising a spacer between said splice bar and said second wall, said spacer having a spacer thickness greater than a thickness of said first bus bar.

6. The assembly of claim 1 further comprising a means for separating said splice bar and said second wall, said means for separating permitting passage of said first bus bar between said splice bar and said second wall.

7. The assembly of claim 1 further comprising a means for separating said splice bar and said second wall, said means for separating defining a space between said splice bar and said second wall equal to a thickness of said first bus bar.

8. A captive splice assembly for electrically and structurally connecting a pair of bus sections, said assembly comprising:
- a housing having a top side, a bottom side substantially parallel to, and in opposition to, said top side, and a back side connecting said top side and said bottom side, said back side having a plurality of threaded apertures;
- a splice bar defining a plurality of splice bar apertures and adapted to fit between said top side and said bottom side, said splice bar positioned substantially parallel to said back side;
- a connector joining said splice bar to said housing; and
- a plurality of threaded members, each of said plurality of threaded members extending through one of said plurality of splice bar apertures and threadably engaging a corresponding one of said plurality of threaded apertures;
- whereby said housing containing said splice bar is slidably positionable along the pair of bus sections, and said captive splice assembly connects the pair of bus sections.

9. The assembly of claim 8 wherein said connector includes a protrusion extending into said housing and a notch in said splice bar, said notch in register with said protrusion wherein said protrusion restrains said splice bar from moving in a direction parallel to said back side.

10. The assembly of claim 8 wherein said housing is fabricated of a non-magnetic metal.

11. The assembly of claim 8 wherein said housing is fabricated of a plastic material.

12. The assembly of claim 8 wherein said plurality of threaded housing apertures include a plurality of nuts that are fixedly attached to said housing.

13. The assembly of claim 8 wherein said plurality of threaded apertures include a plurality of nuts that are fixedly attached to said splice bar.

14. The assembly of claim 8 further comprising a spacer disposed between said splice bar and said back side of said housing, said spacer having a thickness substantially equal to that of a bus bar included in the bus section.

15. The assembly of claim 8 further comprising a spacer disposed between said splice bar and a second splice bar, said second splice bar positioned substantially parallel to said back side, said spacer having a thickness substantially equal to that of a bus bar included in the bus section.

16. The assembly of claim 8 further comprising a means for separating said splice bar and said back side, said means for separating permitting passage of a bus bar included in the bus section between said splice bar and said back side.

17. A captive splice assembly for electrically and structurally connecting a first bus bar to a second bus bar, said assembly comprising:
- a first wall;
- a second wall secured to said first wall along a common first edge, said second wall being oriented generally perpendicular to said first wall and including a second wall aperture;
- a third wall secured to said second wall along a common second edge, said third wall being oriented generally parallel to, and in opposition to, said first wall,
- a first splice bar located between said first wall and said third wall, said first splice bar being oriented generally parallel to said second wall and including a threaded aperture, said threaded aperture being aligned with said second wall aperture;
- a first connector joining said first splice bar to one of said first wall and said third wall; and
- an elongated threaded connector adapted to extend through said threaded aperture in said first splice bar and threadably engage said threaded receptor to secure said first bus bar and said second bus bar to said first splice bar.

18. The assembly of claim 17, further comprising a second splice bar located between said first wall and said third wall, said second splice bar being oriented generally parallel to said second wall and including an aperture, said second splice bar aperture being aligned with a second aperture in said second wall; and
- a second connector joining said second splice bar to one of said first wall and said third wall;
- wherein said elongated threaded connector is further adapted to extend through said second splice bar aperture and threadably engage said threaded receptor to secure said first bus bar and said second bus bar between said first splice bar and said second splice bar.

* * * * *